United States Patent
Palaniappan (10) Patent No.: US 9,280,337 B2
(45) Date of Patent: Mar. 8, 2016

(54) SECURED DISTRIBUTION OF SOFTWARE UPDATES

(75) Inventor: Murugappan Palaniappan, Issaquah, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 2254 days.

(21) Appl. No.: 11/641,266

(22) Filed: Dec. 18, 2006

(65) Prior Publication Data

US 2014/0033193 A1     Jan. 30, 2014

(51) Int. Cl.
| | |
|---|---|
| G06F 9/44 | (2006.01) |
| G06F 9/445 | (2006.01) |
| H04L 9/32 | (2006.01) |
| G06F 21/57 | (2013.01) |

(52) U.S. Cl.
CPC .. *G06F 8/65* (2013.01); *G06F 8/61* (2013.01); *G06F 21/57* (2013.01); *H04L 9/3247* (2013.01); *G06F 2221/2151* (2013.01)

(58) Field of Classification Search
None
See application file for complete search history.

(56) References Cited

U.S. PATENT DOCUMENTS

| | | | | |
|---|---|---|---|---|
| 5,637,573 | A * | 6/1997 | Agrawal et al. | 514/44 R |
| 8,429,412 | B2 * | 4/2013 | Bleckmann et al. | 713/176 |
| 2003/0196096 | A1 * | 10/2003 | Sutton | 713/181 |
| 2004/0093592 | A1 * | 5/2004 | Rao | 717/168 |
| 2006/0175394 | A1 * | 8/2006 | Caven et al. | 235/379 |
| 2006/0236098 | A1 * | 10/2006 | Gantman et al. | 713/158 |
| 2007/0022420 | A1 * | 1/2007 | Yamamoto et al. | 717/177 |
| 2007/0294684 | A1 * | 12/2007 | Kumashiro et al. | 717/168 |
| 2014/0033193 | A1 * | 1/2014 | Palaniappan | 717/173 |

* cited by examiner

*Primary Examiner* — Evral E Bodden
(74) *Attorney, Agent, or Firm* — Shook, Hardy & Bacon, L.L.P.

(57) ABSTRACT

In some embodiments, a system includes a signature server comprising a signature unit to receive an update to a software application. The signature server also includes a first machine-readable medium to store a mapping between an identification of the software application and an address of a location of a private key. The system includes a cryptographic device coupled to an external port of the signature server. The cryptographic device includes a second machine-readable medium to store the private key. The cryptographic device also includes a cryptographic unit to generate a signature of the update based on the private key.

21 Claims, 6 Drawing Sheets

SECURED DISTRIBUTION OF SOFTWARE UPDATES

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright ©2006, Adobe Systems Incorporated. All Rights Reserved.

TECHNICAL FIELD

The application relates generally to data processing, and, in an example embodiment, the application relates to secured distribution of software updates.

BACKGROUND

Typically, software applications are updated to patch security flaws, functional problems, etc. After an update is available, the updates to the software may be posted on a network server. The updates may then be downloaded over a network and installed on computers executing the software.

SUMMARY

In some embodiments, a system includes a signature server comprising a signature unit to receive an update to a software application. The signature server also includes a first machine-readable medium to store a mapping between an identification of the software application and an address of a location of a private key. The system includes a cryptographic device coupled to an external port of the signature server. The cryptographic device includes a second machine-readable medium to store the private key. The cryptographic device also includes a cryptographic unit to generate a signature of the update based on the private key.

BRIEF DESCRIPTION OF THE DRAWINGS

The embodiments are provided by way of example and not limitation in the figures of the accompanying drawings, in which like references indicate similar elements and in which.

DETAILED DESCRIPTION

Methods, apparatus and systems for secured distribution of software updates are described. In the following description, numerous specific details are set forth. However, it is understood that embodiments of the invention may be practiced without these specific details. In other instances, structures and techniques have not been shown in detail in order not to obscure the understanding of this description.

As used herein, the term "update" refers to electronic data used for updating various updateable data associated with a software application. The update may be to binaries, scripts, text-based files, etc. for a software application. As used herein, the term "software application" refers to a variety of applications, programming, data mark-up languages, etc. (e.g., Adobe® Portable Document Format (PDF), Hypertext Mark-up Language (HTML), Extensible Mark-up Language (XML), Extensible Style Sheets Language (XSL), Word®, WordPerfect®, JAVA®, ActiveX®, Tag Image File Format (TIFF), Microsoft Excel®, Microsoft PowerPoint®, Joint Photographic Experts Group (JPEG), Graphics Interchange Format (GIF), text format, etc.). The software application may also include various system-level software (such as operating systems, drivers for hardware, etc.).

As used herein, the term "client device" refers to any type of device that may execute a software application. The client device may be a thin client, fat client, or a hybrid client. For example, client devices may include desktop computer, notebook computers, wireless/wired devices, mobile devices (such as cellular telephones, Personal Digital Assistants (PDAs)), media players (such as MP-3 devices), gaming consoles, set-top boxes, etc.

As used herein, the term "cryptographic device" may refer to any type of device that performs cryptographic operations based on cryptographic keys stored within a machine-readable medium within the cryptographic device. In some embodiments, the cryptographic device may perform the cryptographic operations using cryptographic keys stored in a machine-readable medium that is external to the cryptographic device. In some embodiments, the cryptographic device may be used for storage of cryptographic keys, such that the operations are performed by a device external to the cryptographic device. In some embodiments, the cryptographic device is an external portable device that may be externally coupled to a port of a computer. For example, a cryptographic device may be a dongle, a hardware key, a hardware token, a security device, etc. The cryptographic device may perform various cryptographic operations (such as public key cryptography, private key cryptography, digital signatures, hashing, etc.).

As used herein, "manifest data" refers to data that includes various attributes for a software update. The manifest data may be within a file, a data structure (such as tables, records, trees, list, arrays, etc.), etc. As further described below, the manifest data may store the identification and data to locate the software application being updated, a cryptographic signature for the update, the size of the update, etc.

As used herein, "hash" refers to any type of digital fingerprint or message digest that is representative of a set of data. The hash may be reversible or irreversible. The hash may be derived from any number of different cryptographic hash functions. For example, the cryptographic hash functions may include various Message Digest (MD) algorithms (such as MD-5, MD-4, etc.), various Secure Hash Algorithms (SHA) (such as SHA-1, SHA-224, SHA-256, SHA-384, SHA-512, etc.), various HAVAL hash functions, various PANAMA hash functions, etc.

Figure 1:
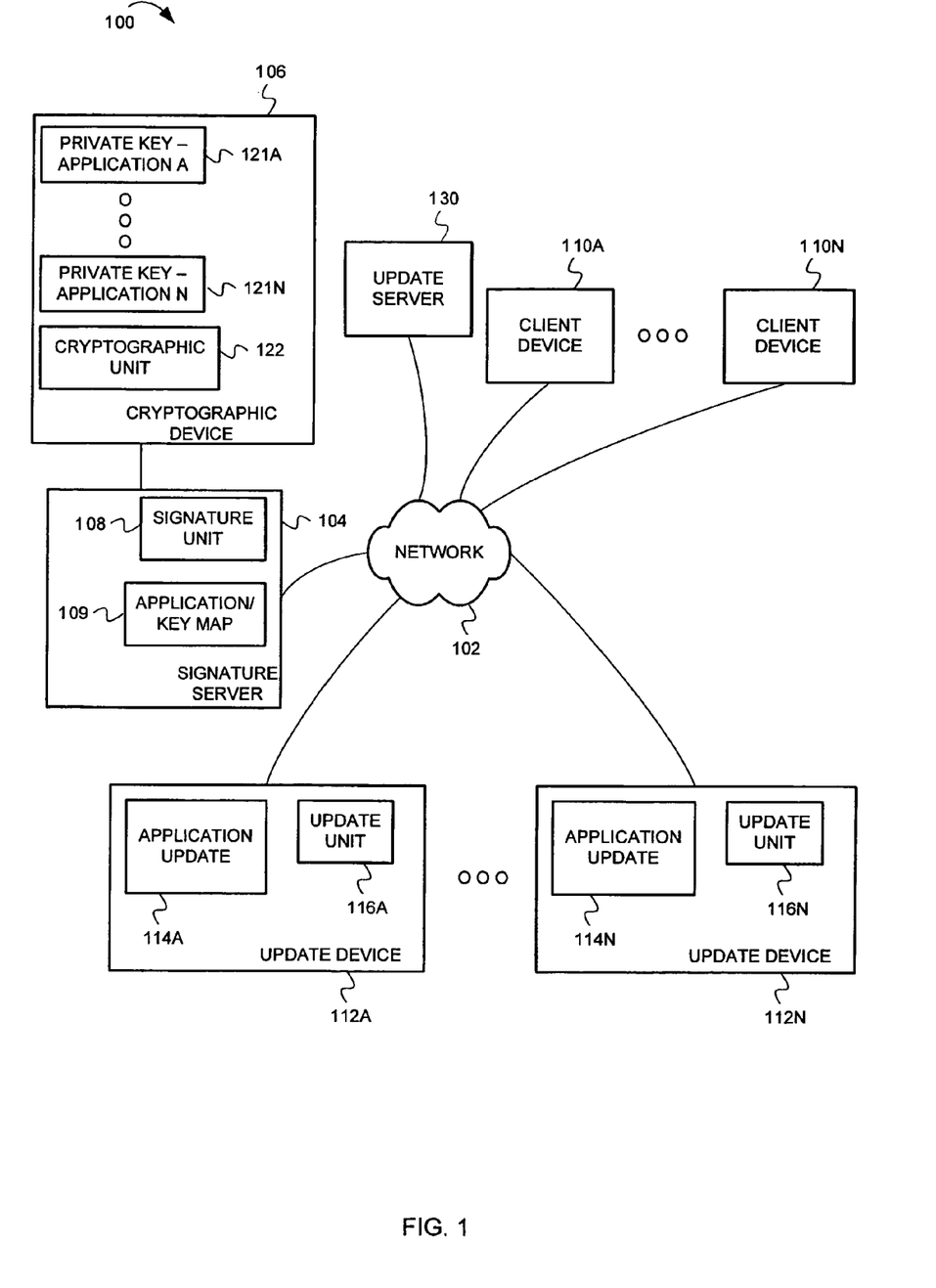
FIG. 1 is a system for secured distribution of software updates, according to some embodiments.

FIG. 1 is a network diagram of a system for secured distribution of software updates, according to some embodiments. A system 100 comprises a network 102 that couples together one to a number of client devices 110A-110N, one to a number of update devices 112A-112N, an update server 130 and a signature server 104. The network communication may be any combination of wired and wireless communication. In some embodiments, the network communication may be based on one or more communication protocols (e.g., Hyper-Text Transfer Protocol (HTTP), HTTP Secured (HTTPS), etc.). While the system 100 shown in FIG. 1 employs a client-server architecture, embodiments are not limited to such an architecture, and could equally well find application in a distributed, or peer-to-peer, architecture system.

The update devices 112 include update units 116 and application updates 114. The update unit 116 may be software, hardware, firmware or a combination thereof for executing operations, according to some embodiments. The application update 114 is representative of the update (such as a patch) for a software application that resides on one or more of the client devices 110. For example, the update devices 112 may be devices used by software programmers/developers that develop an update for a software application that is currently being used by users of the client devices 110.

The signature server 104 includes a signature unit 108. The signature unit 108 may be software, hardware, firmware or a combination thereof for executing operations, according to some embodiments. The signature server 104 may also include an application/key map 109. The application/key map 109 may be any type of data structure (such as a table, record, list, etc.) that maps an identification of a software application being update to the address of the private key used to encrypt the update. A cryptographic device 106 is coupled to external port (such as a Universal Serial Bus (USB) port, Firewire port, etc.). The cryptographic device 106 includes a cryptographic unit 122 and one to a number of private keys 121A-121N. In some embodiments, a private key 121 may be associated with a particular software application that is to be updated. For example, the private key 121A is used for securing application A, the private key 121N is used for securing application N, etc. One to any number of cryptographic devices 104 may be coupled to external ports of the signature server 104. In some embodiments, there may be a 1:1 or 1:M mapping between a private key and software applications. A particular cryptographic device 106 may store the different private keys for applications associated with a particular suite of applications. As further described below, the corresponding public keys are distributed and stored with the software application on the client devices 110.

Figure 3:
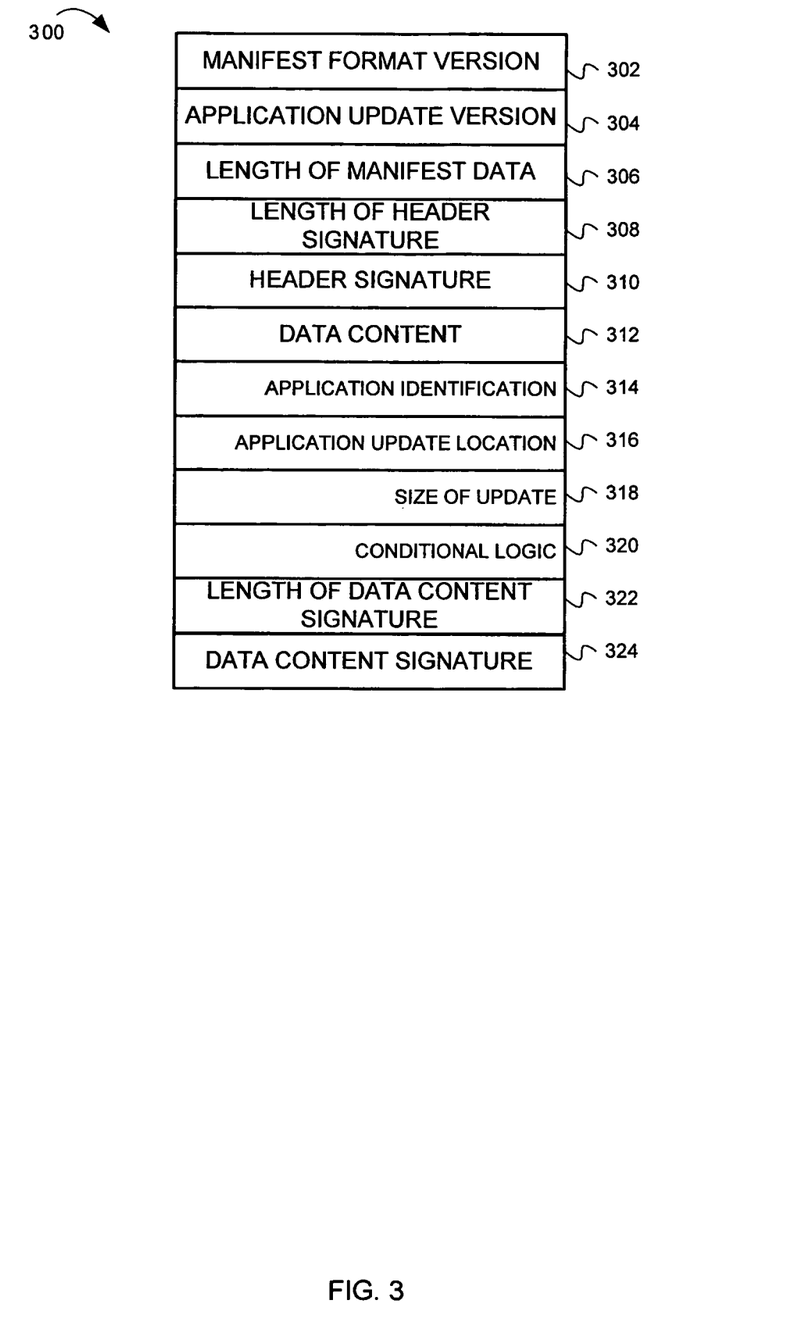
FIG. 3 is a data structure of manifest data associated with a software update, according to some embodiments.

In some embodiments, a software developer/programmer may develop an update for a software application that is current residing on one or more client devices 110. After completion of the application update 114, the software developer/programmer may use the signature server 104 to generate at least part of a manifest data for an update. An example embodiment of the manifest data is illustrated in FIG. 3, which is described in more detail below. As further described below, the manifest data allows for secure distribution of the update. After receiving manifest data from the signature server 104, the application update 114 and the manifest data may be uploaded to the update server 130 (for subsequent distribution to the client devices 110 that execute the associated software application.

Figure 2:
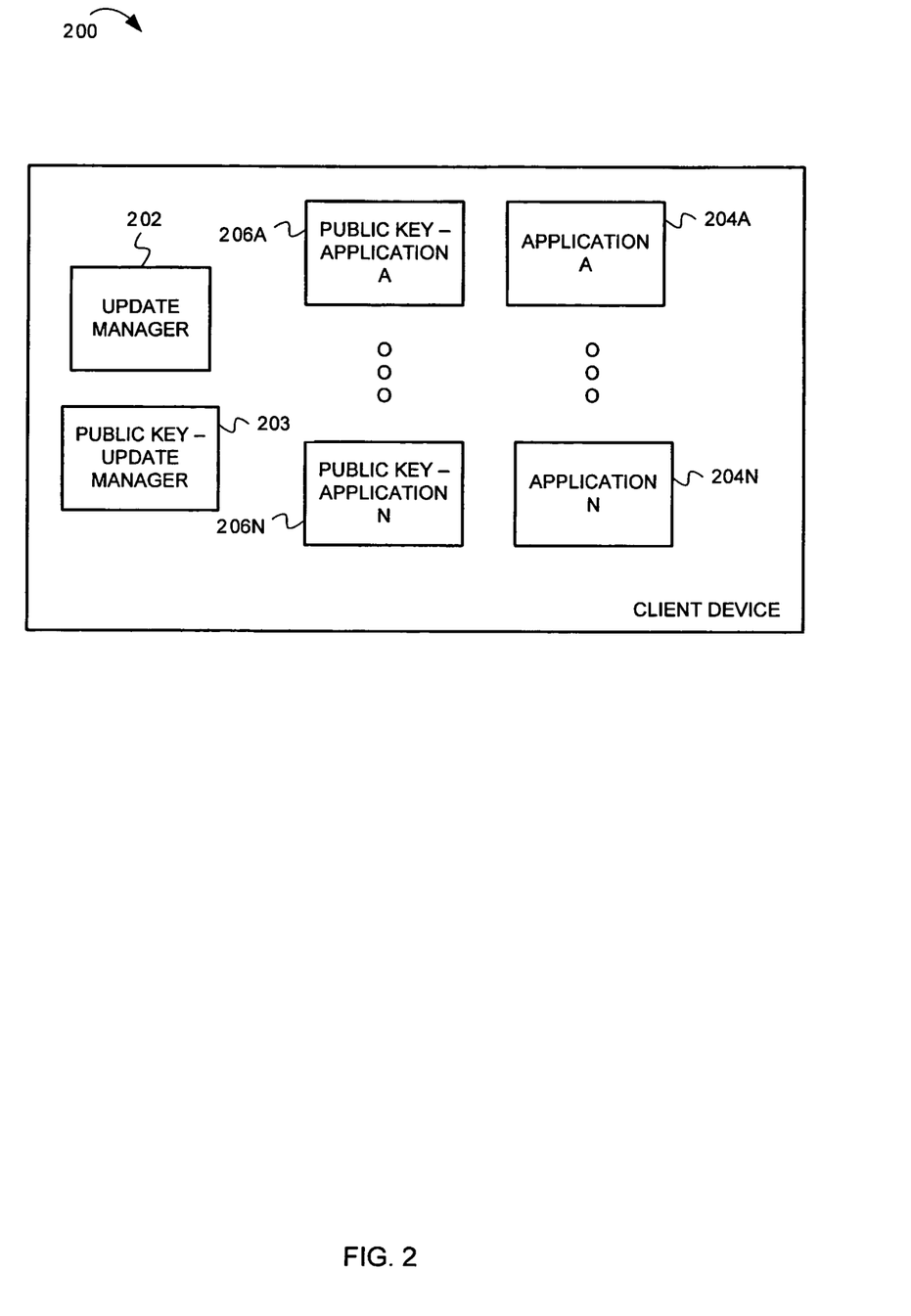
FIG. 2 is a more detailed block diagram of a client device that downloads software updates, according to some embodiments.
Figure 6:
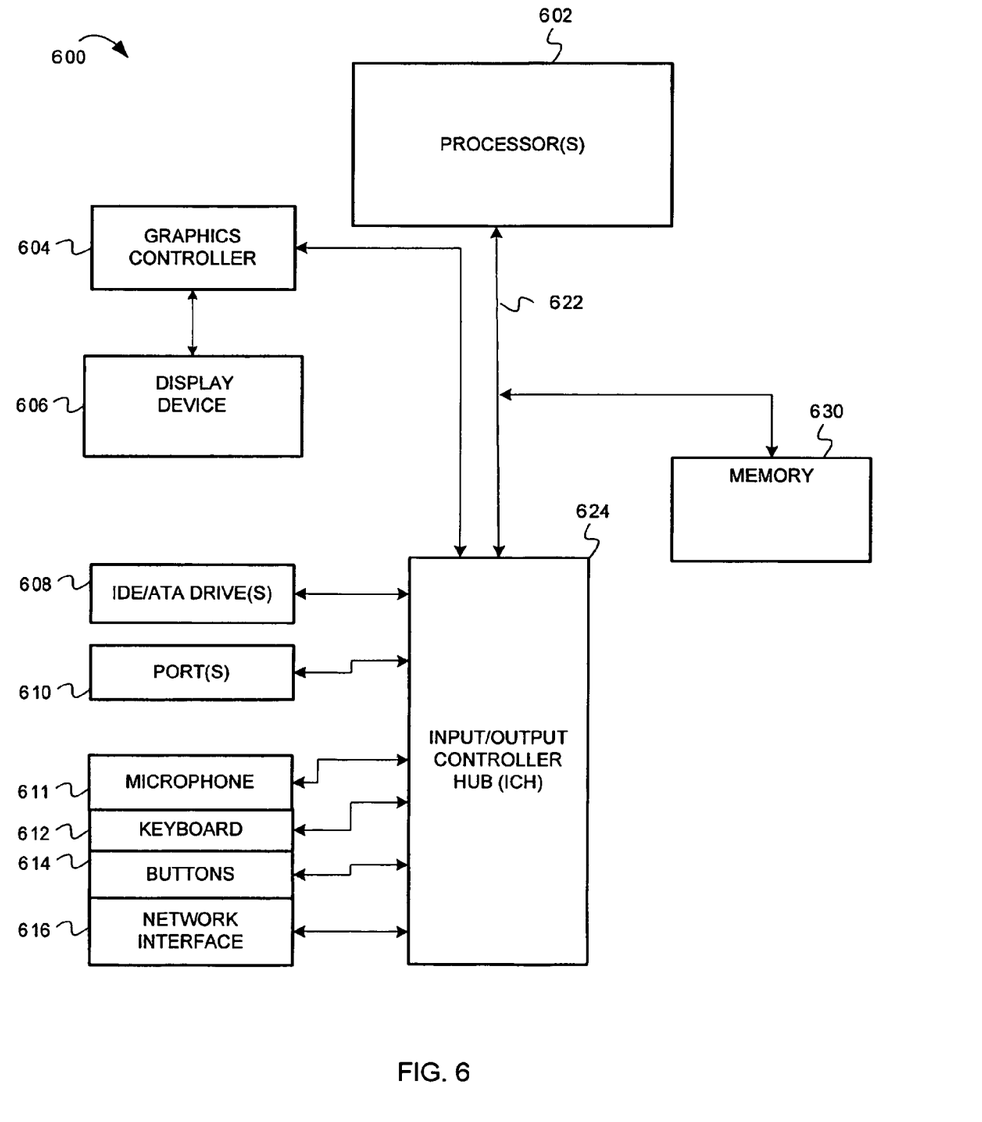
FIG. 6 is a more detailed block diagram of a computer device, according to some embodiments.

FIG. 2 is a more detailed block diagram of a client device that downloads software updates, according to some embodiments. A more detailed diagram of an example embodiment of the client device 110 is illustrated in FIG. 6, which is described in more detail below. The client device 110 includes an update manager 202. The update manager 202 may be software, hardware, firmware or a combination thereof for executing operations, according to some embodiments. The client device 206 includes a public key 203 that is used for validating updates for the update manager 202. The client device 110 also includes applications 204A-204N and public keys 206A-206N. In some embodiments, a private key 206 may be associated with a particular software application that is to be updated. For example, the public key 206A is used for securing application A, the public key 206N is used for securing application N, etc.

In some embodiments, the public/private key certificate for the update manager 202 is configured in a multi-certificate architecture. For example, if during the validation, a first certificate for the update manager 202 has been revoked, a second certificate is used. The second certificate can then be used to sign the update for the update manager 202. In some embodiments, the update to the update manager 202 may be used in a bootstrapping operation to recover the revoked certificates. In particular, the update sent over may include new public keys for the update manager 202. Similarly, in some embodiments, this bootstrap operation may be used to recover revoked certificates for the software applications. Accordingly, the update to the update manager 202 may include the new public keys to replace the revoked certificates. In some embodiments, this bootstrap operation may also be used to replace certificates on the client device 110 that are not able to validate the data (as further described below).

FIG. 3 is a data structure of manifest data associated with a software update, according to some embodiments. Manifest data 300 includes various attributes for a software update. In some embodiments, the manifest data 300 is associated with one or more updates for a given software application. The manifest data 300 includes a manifest format version field 302, which identifies the particular version of the format for the manifest data 300. In particular, different versions of the manifest data 300 may comprise different data and order. The manifest data 300 includes the application update version field 304. In some embodiments, the version for the application update is a timestamp for a time associated with the application update (as further described below). The manifest data 300 also includes the length of the manifest data field 300, which identifies the size of the manifest data 300. The manifest data also includes the length of the header signature field 308. The field 308 provides the length of the header signature (which is described below).

The manifest data 300 includes the header signature field 310. The field 310 is a hash across the data content 312, the length of the data content signature 322 and the data content signature 324. As further described below, the header signature field 310 is used to validate the manifest data 300. The manifest data 300 includes the data content 312, which includes the fields 314-320 (now described). The data content 312 includes the application identification field 314, which is an identification of the software application being updated. The data content 312 also includes the application update location field 316. The field 316 provides the address (such as the Uniform Resource Locator (URL) address) on the update server 130 where the update is stored. The data content 312 includes the size of the update field 318, which stores a size of the update for the software application. The data content 312 may also include the conditional logic field 320. The field 320 includes usage attributes for the update. For example, the usage attributes may include the applicable operating system for which the update may be executed. A particular update may only be applicable to a software application that is executing on a particular operating system. Another usage attribute may include the applicable language. A particular update may only be applicable to a software application that receives and outputs user input/output in a particular language. Another usage attribute may include the applicable machine architecture (e.g., an architecture that includes an Intel®—based processor executing a Macintosh®—based operating system). Other usage attributes may include various settings on the client device 110. In some embodiments, settings within a system registry on the client device 110 may be checked. For example, a determination may be made of different flags within the system registry have been set.

The manifest data 300 also includes a length of the data content signature field 322. The field 322 provides the length of the data content signature (which is described below). The manifest data 300 includes the data content signature field 324. The field 324 is a hash across the update. As further described below, the data content signature field 324 is used to validate the update.

Figure 4:
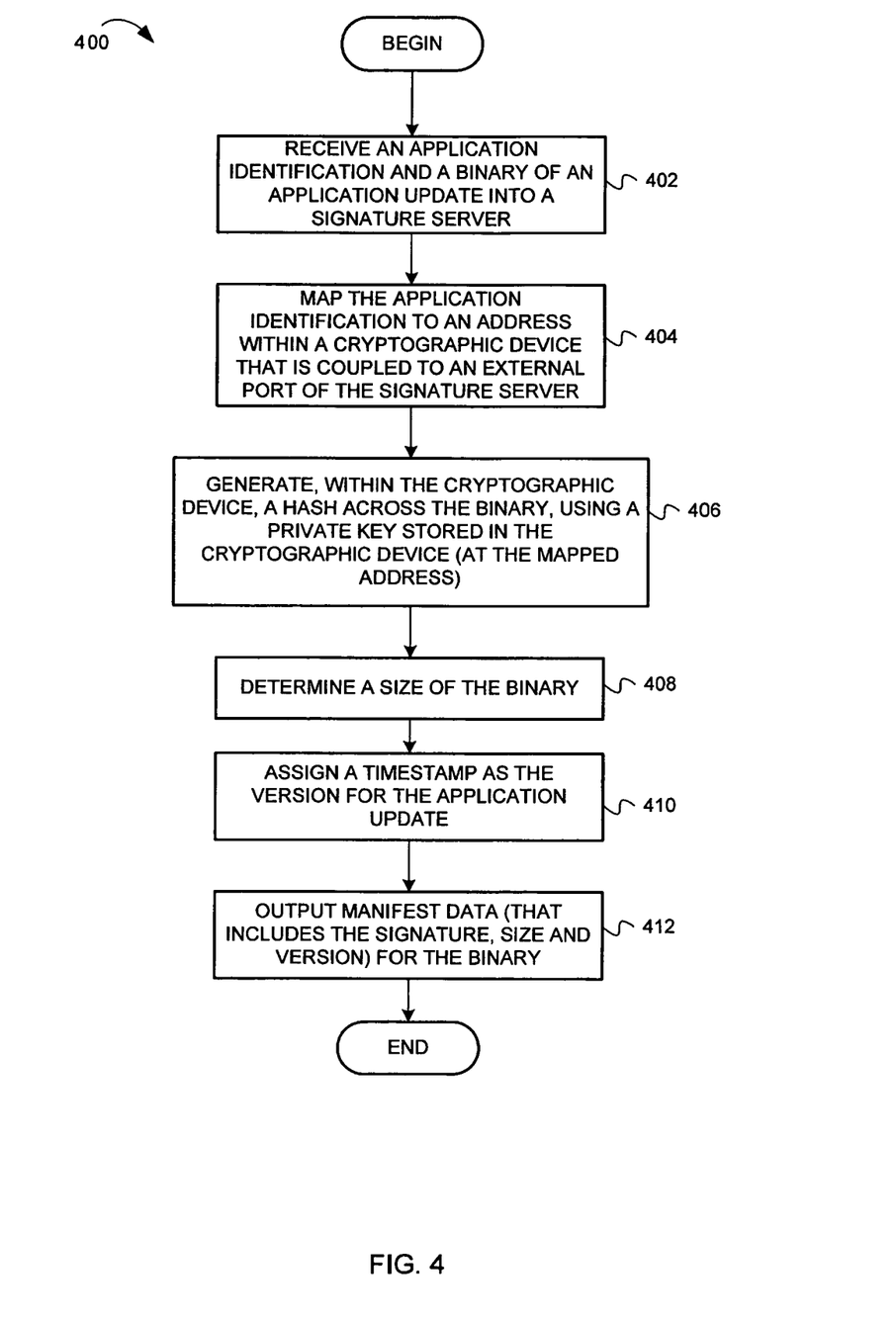
FIG. 4 is a diagram of a method generating manifest data for a software update, according to some embodiments.

Operations, according to some embodiments, are now described. In certain embodiments, the operations are performed by instructions residing on machine-readable media (e.g., software), while in other embodiments, the methods are performed by hardware or other logic (e.g., digital logic). FIG. 4 is a flow diagram for generating manifest data for secured distribution of software updates, according to some embodiments. The flow diagram 400 is described with reference to FIGS. 1 and 3. In some embodiments, the flow diagram 400 is performed by the signature unit 108 in the signature server 104 and the cryptographic unit 122 in the cryptographic device 106. The flow diagram 400 commences at block 402.

At block 402, an application identification and a location of a binary of an update to the application are received into a signature server. With reference to FIG. 1, the update unit 116 of one of the update devices 112 may transmit this data over the network 102 to the signature unit 108 of the signature server 104. For example, a software developer/programmer may initiate this operation after an application update is ready to be used for updating a software application on the client devices 110. Accordingly, the update unit 116 may transmit the location of the application update 114 and an identification of the application to the signature unit 108. The signature unit may then download the application update 114 into the signature server 112. While illustrated as residing on the update device 112, the application update 114 may be stored in other devices (such as file servers not shown) that are coupled to the network 102. The flow continues at block 404.

At block 404, the application identification is mapped to an address within a cryptographic device that is coupled to an external port of the signature server. In particular, the address within the cryptographic device 106 is the location where a private key 121 is stored therein. With reference to FIG. 1, the application/key map 109 may be used to map the application identification to the address of the private key. As further described below, the private key 121 is used to generate a signature for the application update. In some embodiments, one to a number of cryptographic devices may be coupled to external ports of the signature server 104. Moreover, a number of different private keys may be stored in a particular cryptographic device 106. Therefore, the signature unit 108 maps the application identification to a particular address for a particular cryptographic device 106 (if more than one). The flow continues at block 406.

At block 406, a hash is generated, within the cryptographic device, across the binary, using the private key stored in the cryptographic device (at the mapped address). With reference to FIG. 1, in some embodiments, the application update 114 may be transmitted to the cryptographic device 106. The cryptographic unit 122 may generate the hash for the application update 114, using the associated private key 121. The cryptographic unit 122 may then return the hash to the signature server 104. The flow continues at block 408.

At block 408, a size of the binary of the application update is determined. With reference to FIG. 1, the signature unit 108 may perform this operation. For example, the signature unit 108 may determine the length of the binary in terms of the number of bytes. The flow continues at block 410.

At block 410, a timestamp is assigned as the version of the application update. In some embodiments, the signature unit 108 performs this operation. In some embodiments, the timestamp is at the time when the signature server 104 receives the application update 114 from the update device 112. In some embodiments, the timestamp is at the time when the cryptographic unit 122 performs the hash operation. In some environments, the timestamp is at the time when many timestamp is assigned as the version for the application update.

At block 412, manifest data (that includes the signature, size and version) for the application update is output. In some embodiments, the signature unit 108 outputs the manifest data over the network 102 and back to the update device 112 that originally transmitted the application update 114 to the signature server 104. The operations of the flow diagram 400 are complete.

After receiving the manifest data back from the signature server 104, the update unit 116 may then generate the data structure for the manifest data (see the manifest data 300 in FIG. 3). The update unit 116 may also fill in the manifest data. The update unit 116 may fill in the data with the parts of the manifest data received back from the signature server 104. Moreover, the update unit 116 may also fill in the other parts of the manifest data 300. For example, the update unit 116 may fill in the manifest format version field 302, the length of the manifest data field 306, the header signature field 310, the application update location field 316 and the conditional logic field 320. In some embodiments, the update unit 116 generates the header signature 310 by performing a hash across the data content 312, the length of the data content signature 322 and the data content signature 324. The update unit 116 may use a private key stored on a machine-readable medium on the update device 112 to generate the header signature 310. The associated public key may be stored in an installation directory for the associated software application on the client device 110.

The update unit 116 may then upload the application update 114 and the associated manifest data 300 to the update server 130. The application update 114 is then ready to be downloaded by the client devices 110 that have the associated software application. The operations for downloading of the application update 114 by the client devices 110 are now described.

Figure 5:
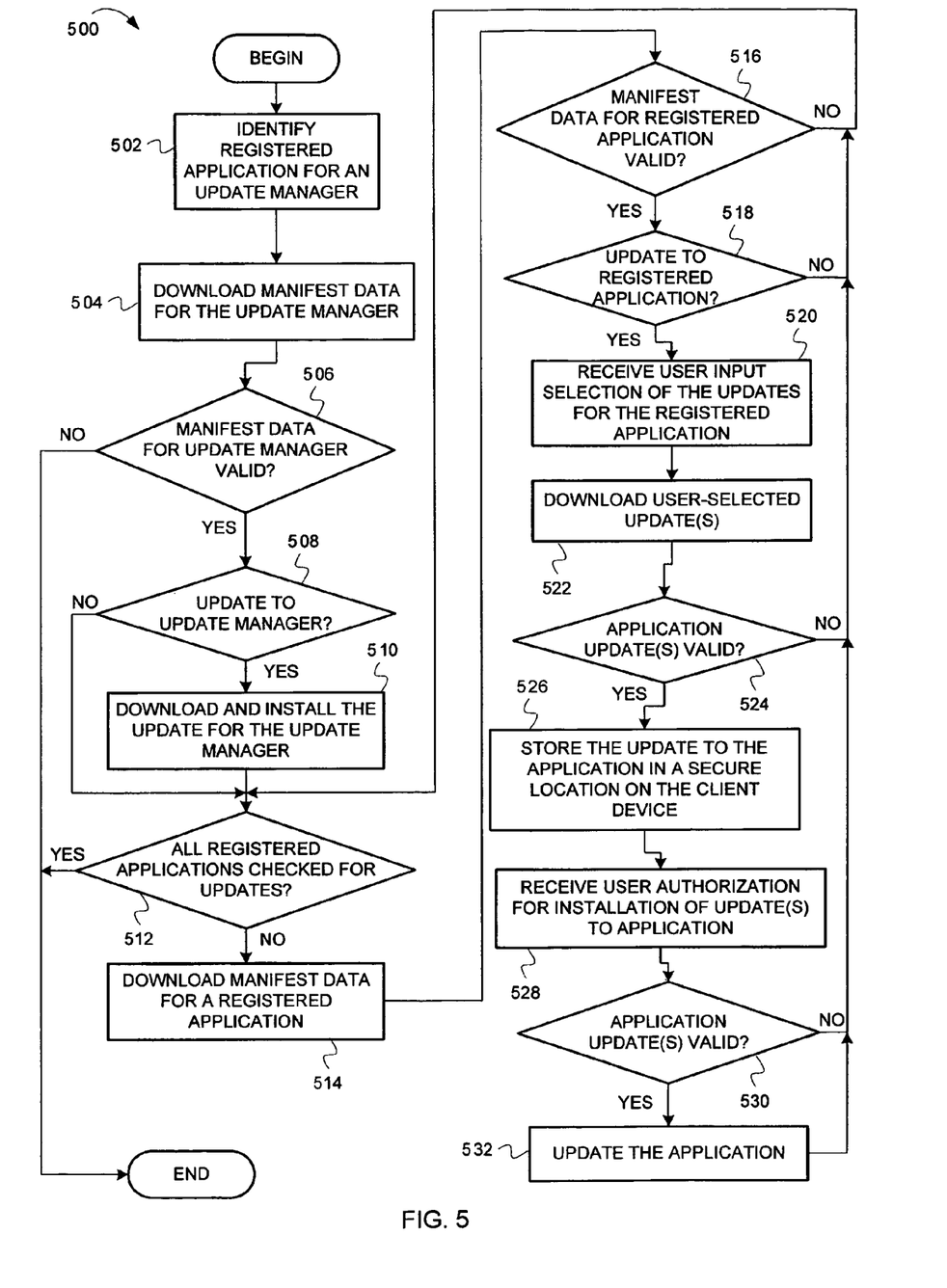
FIG. 5 is a diagram of a method for downloading and installing of software updates, according to some embodiments.

FIG. 5 is a flow diagram for securely downloading and installing a software update, according to some embodiments. The flow diagram 500 is described with reference to FIGS. 1-3. In some embodiments, the flow diagram 500 is performed by the update manager 202. In some embodiments, the flow diagram 500 is initiated based on user input to determine whether updates are available for the software applications on the client device 110. In some embodiments, the update manager 202 may initiate the operations of the flow diagram 500. For example, the update manager 202 may periodically check for updates for the software applications for which the update manager 202 is responsible. The flow diagram 500 commences at block 502.

At block 502, the software applications registered for the update manager are identified. With reference to FIG. 2 the update manager 202 identifies all of the applications 204 that are registered with the update manager 202. In particular, the update manager 202 may be responsible for the updates to a number of different software applications on the client device 110. The flow continues at block 504.

At block 504, the manifest data for the update manager is downloaded. With reference to FIGS. 1-2, the update manager 202 downloads the manifest data for the update manager 202 from the update server 130. The flow continues at block 506.

At block 506, a determination is made of whether the manifest data for the update manager is valid. With reference to FIG. 3, the update manager 202 may make this determination based on the header signature 310. In some embodiments, the header signature 310 is a hash across the data content 312, the length of the data content signature 322 and the data content signature 324. The update manager 202 may regenerate the hash using a public key stored in the installation directory for the update manager 202 on the client device 110.

In some embodiments, prior to using the public key, the update manager 202 verifies that the certificate for the public/private key has not been revoked. The update manager 202 may communicate over the network 102 to a certificate authority that issued the certificate. If the certificate has been revoked, a second certificate may be used. In particular, the public/private key certificate for the update manager 202 may be configured in a multi-certificate architecture. Accordingly, more than one public key may be stored on the client device 110 for the update manager 202. For example, if during the validation, a first certificate for the update manager 202 has been revoked, a second certificate is used. The second certificate can then be used to validate the manifest data. The update to the update manager 202 may be used in a bootstrapping operation to recover the revoked certificates. In particular, the update sent over may include new public keys for the update manager 202. In some embodiments, if all the certificates have been revoked, the potential updates to the software application are terminated and the operations of the flow diagram 500 are complete. Assuming that a certificate has not been revoked, if the regenerated hash matches the header signature 310, the manifest data 300 is valid. If the manifest data 300 is not valid, the operations of the flow diagram 500 are complete. Otherwise, the flow continues at block 508.

At block 508, a determination is made of whether there are updates to the update manager. With reference to FIG. 3, the update manager 202 may make this determination based on the update version 304. The update manager 202 may determine whether the update version 304 is more recent than its own version. If there are no updates to the update manager 202, the flow continues at block 512, which is described in more detail below. Otherwise, the flow continues at block 510.

At block 510, the update for the update manager is downloaded and installed. With reference to FIGS. 1-2, the update manager 202 may download the update(s) from the update server 130 over the network 102. The flow continues at block 512.

At block 512, a determination is made of whether all registered software applications have been checked for updates. With reference to FIGS. 1-2, as further described below, the update manager 202 may download the manifest data for each registered software application from the update server 130. The update manager 202 may determine whether an update is needed and whether such updates are valid. Accordingly, the update manager 202 determines whether these operations have been performed for each of the registered software applications. If all registered software applications have been checked for updates, the flow diagram 500 is complete. Otherwise, the flow continues at block 514.

At block 514, the manifest data for a registered software application (that has not been checked) is downloaded. With reference to FIGS. 1-2, the update manager 202 downloads the manifest data from the update manager 130. The flow continues at block 516.

At block 516, a determination is made of whether the manifest data for the registered software application is valid. With reference to FIG. 3, the update manager 202 may make this determination based on the header signature 310. In some embodiments, the header signature 310 is a hash across the data content 312, the length of the data content signature 322 and the data content signature 324. The update manager 202 may regenerate the hash using a public key stored in the installation directory for the software application on the client device 110. In some embodiments, prior to using the public key, the update manager 202 verifies that the certificate for the public/private key has not been revoked. In some embodiments, the update manager 202 may communicate over the network 102 to a certificate authority that issued the certificate. If the certificate has been revoked, the potential update to the software application is terminated and the flow continues at block 512 where checks are made for other software applications. Thus, updates to other software applications may continue. In other words, the updates to the software applications are independent of each other because of the different keys for the different software applications. As described above, in some embodiments, the updates to the update manager 202 may include new certificates that replace the revoked certificates. Accordingly, an administrator of the signature server 104 may distribute the new public key certificate as an update to the update manager 202. Further, the administrator may update the associated private key stored in the cryptographic device 106. Assuming that the certificate has not been revoked, if the regenerated hash matches the header signature 310, the manifest data 300 is valid. If the manifest data 300 is not valid, the potential update to the software application is terminated and the flow continues at block 512. Otherwise, the flow continues at block 518.

At block 518, a determination is made of whether there are updates to the software application. With reference to FIG. 3, the update manager 202 may make this determination based on the update version 304. The update manager 202 may determine whether the update version 304 matches the version of the software application currently on the client device 110. If there are no updates to the software application, the flow continues at block 512. Otherwise, the flow continues at block 520.

At block 520, user input for the selection of the updates for the registered software application is received. With reference to FIG. 3, the update manager 202 may receive the user input. The manifest data received for the software application may indicate that one to a number of updates may be available. Accordingly, the update manager 202 may present these updates to the user. The user may then select which, if any, of the updates are to be downloaded. In some embodiments, the user may not select any of the updates. Therefore, the control continues at block 512. Otherwise, the flow continues at block 522.

At block 522, the user-selected update(s) are downloaded. With reference to FIGS. 1-2, the update manager 202 downloads these updates. In some embodiments, the update manager 202 initially downloads the update(s) into a volatile machine-readable media (such as a random access memory) in the client device 110. Accordingly, as described, the hash (which is part of the manifest data 300) used for validation is transmitted separately from the associated updates for the software application. The flow continues at block 524.

At block 524, a determination is made of whether the update(s) to the software application are valid. With reference to FIG. 2, the update manager 202 may make this determination based on the public key 206 associated with the software application. The update manager 202 may generate a hash across the update. The update manager 202 may generate the hash using a public key stored in the installation directory for the software application on the client device 110. In some embodiments, prior to using the public key, the update manager 202 verifies that the certificate for the public/private key has not been revoked. In some embodiments, the update manager 202 may communicate over the network 102 to a certificate authority that issued the certificate. If the certificate has been revoked, the potential update to the software application is terminated and the flow continues at block 512 where checks are made for other software applications. Thus, updates to other software applications may continue. In some embodiments, as part of the validity check, the update manager 202 may check usage attributes for the update. For example, the update manager 202 may check the usage attributes stored in the conditional logic field 320 to determine if this update is for the operating system, machine architecture, language, etc. for the client device 110. Assuming that the certificate has not been revoked, if the regenerated hash matches the data content signature 324 stored in the manifest data 300, the manifest data 300 is valid. If the update is not valid, the update operation using this update for the software application is terminated. The flow continues at block 512. Otherwise, the flow continues at block 526.

At block 526, the update to the software application is stored in a secure location on the client device. The update manager 202 may store the update in a protected part of a non-volatile machine-readable medium on the client device 110. For example, the update manager 202 may store the update in a part of the non-volatile machine-readable medium that requires administrative privileges for the client device 110 to access. The flow continues at block 528.

At block 528, user authorization for installation of the update(s) to the software application is received. The update manager 202 may present these updates for installation to the user. The user may then select which, if any, of the updates are to be installed. In some embodiments, the user may delay the installation of some or all of the updates to the software application. The flow continues at block 530.

At block 530, a determination is made of whether the update(s) to the software application are valid. With reference to FIG. 2, the update manager 202 may make this determination based on the public key 206 associated with the software application. Accordingly, as described, the validity of the update(s) are check during the download (see block 524) and again prior to installation. The user may have an extended period of time between the download and the installation. Therefore, the update manager 202 rechecks the validity of the update prior to installation to ensure that the update has not been compromised subsequent to the first check for validity. The update manager 202 may generate a hash across the update. The update manager 202 may generate the hash using a public key stored in the installation directory for the software application or the client device 110. In some embodiments, prior to using the public key, the update manager 202 verifies that the certificate for the public/private key has not been revoked. In some embodiments, the update manager 202 may communicate over the network 102 to a certificate authority that issued the certificate. If the certificate has been revoked, the potential update to the software application is terminated. With reference to FIG. 3, if the regenerated hash matches the data content signature 324 stored in the manifest data 300, the manifest data 300 is valid. If the update is not valid, the update operation using this update for the software application is terminated. The flow continues at block 512. Otherwise, the flow continues at block 532.

At block 532, the software application is updated. The update manager 202 updates the software application using the update that has been validated. The update may patch various problems (such as security flaws, functional issues, etc.) of the software application. The flow continues at block 512. Therefore, the operations of the flow diagram 500 continue until all of the registered software applications have been check for updates (as described at block 512).

A detailed block diagram of an example computer environment, according to some embodiments, is now described. In particular, FIG. 6 illustrates a computer that may be used for secured distribution of software updates, according to some embodiments. A computer system 600 may be representative of one of the client devices 110, the signature server 108, the update server 130, or one of the update devices 112.

As illustrated in FIG. 6, the computer system 600 comprises processor(s) 602. The computer system 600 also includes a memory unit 630, processor bus 622, and Input/Output controller hub (ICH) 624. The processor(s) 602, memory unit 630, and ICH 624 are coupled to the processor bus 622. The processor(s) 602 may comprise any suitable processor architecture. The computer system 600 may comprise one, two, three, or more processors, any of which may execute a set of instructions in accordance with embodiments of the invention.

The memory unit 630 may store data and/or instructions, and may comprise any suitable memory, such as a dynamic random access memory (DRAM). The computer system 600 also includes IDE drive(s) 608 and/or other suitable storage devices. A graphics controller 604 controls the display of information on a display device 606, according to some embodiments of the invention.

The input/output controller hub (ICH) 624 provides an interface to I/O devices or peripheral components for the computer system 600. The ICH 624 may comprise any suitable interface controller to provide for any suitable communication link to the processor(s) 602, memory unit 630 and/or to any suitable device or component in communication with the ICH 624. For one embodiment of the invention, the ICH 624 provides suitable arbitration and buffering for each interface.

For some embodiments of the invention, the ICH 624 provides an interface to one or more suitable integrated drive electronics (IDE) drives 608, such as a hard disk drive (HDD) or compact disc read only memory (CD ROM) drive, or to suitable universal serial bus (USB) devices through one or more USB ports 610. For one embodiment, the ICH 624 also provides an interface to a keyboard 612, a mouse 614, a CD-ROM drive 618, one or more suitable devices through one or more firewire ports 616. For one embodiment of the invention, the ICH 624 also provides a network interface 620 though which the computer system 600 can communicate with other computers and/or devices.

In some embodiments, the computer system 600 includes a machine-readable medium that stores a set of instructions (e.g., software) embodying any one, or all, of the methodologies for described herein. Furthermore, software may reside, completely or at least partially, within memory unit 630 and/or within the processor(s) 602.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A computer-implemented method comprising:
    downloading manifest data for a software update into a client device, the manifest data including a manifest data signature, a software update storage location, and a software update signature;
    verifying the manifest data by generating a first hash across the manifest data using an updateable public key stored in a file directory of the client device and comparing the first hash to the manifest data signature;
    downloading the software update from the software update storage location to the client device after verifying the manifest data;
    validating the software update by generating a second hash across the software update using the updateable public key and comparing the second hash to the software update signature;
    storing the software update into a machine-readable medium of the client device;
    revalidating the software update, just prior to installation thereof, by regenerating the second hash across the software update using the updateable public key and comparing the second hash to the software update signature;
    installing, using one or more processors, the software update on the client device.

2. The method of claim 1, wherein verifying the manifest data further comprises determining whether a first key certificate for the public key has been revoked.

3. The method of claim 2, wherein verifying the manifest data further comprises determining whether a second key certificate for the public key has been revoked based on the first key certificate being revoked.

4. The method of claim 1, further comprising revoking a certificate of the public key in response to a determination that the second hash is not equal to the software update signature.

5. The method of claim 1, wherein the downloading, validating, and revalidating are performed by an update manager on the client device, wherein the method further comprises the following, prior to downloading the update to the software:
    checking for an update manager update,
    wherein upon determining that the update manager update is available—
        downloading the update manager update and the manifest data, the manifest data further including an update manager update signature, and
        validating a signature of the update manager update by generating a third hash using the updateable public key and comparing the third hash to the update manager update signature.

6. The method of claim 1, wherein the manifest data further includes conditional logic that defines a usage attribute for the software update, the usage attribute selected from a group consisting of an applicable operating system, an applicable language, an applicable machine architecture, and a setting in a system registry of the client device.

7. One or more non-transitory computer-storage media having computer-executable instructions embodied thereon that, when executed by one or more computing devices, perform a method comprising:
    downloading manifest data for a software update into a client device, the manifest data including a manifest data signature, a software update storage location, and a software update signature;
    verifying the manifest data by generating a first hash across the manifest data using one of a first updateable public key and a second updateable public key stored together in a file directory of the client device, and comparing the first hash to the manifest data signature;
    downloading the software update from the software update storage location to the client device after verifying the manifest data;

validating the software update by generating a second hash across the software update using one of the first public key and the second public key and comparing the second hash to the software update signature;

storing the software update into a machine-readable medium of the client device;

revalidating the software update, just prior to installation thereof, by regenerating the second hash across the software update using one of the first public key and the second public key and comparing the second hash to the software update signature;

installing, using one or more processors, the software update on the client device.

8. The media of claim 7, wherein prior to verifying the manifest data, the method further comprises determining whether a first key certificate for the first public key has been revoked.

9. The media of claim 8, wherein the first key certificate is part of a multi-certificate architecture.

10. The media of claim 8, wherein prior to verifying the manifest data, the method further comprises generating the first hash across the manifest data using the second public key in response to a determination that the first public key has been revoked.

11. The media of claim 10, wherein prior to verifying the manifest data, the method further comprises updating the first public key by downloading a new public key to replace the first public key.

12. The media of claim 7, wherein the manifest data further includes conditional logic that defines a usage attribute for the software update, the usage attribute selected from a group consisting of an applicable operating system, an applicable language, an applicable machine architecture, and a setting in a system registry of the client device.

13. A method comprising:

receiving a binary of an update to an application into a signature server;

receiving an identification of the application into the signature server;

mapping, using at least one processor, the identification of the application to an address within a cryptographic device that is coupled to an external port of the signature server;

generating, within the cryptographic device, a first hash across the binary using a private key that is stored in the cryptographic device and associated with the application; and outputting manifest data to be downloaded by one or more client devices, the manifest data comprising the first hash, a manifest data signature, and a location where the update is stored for downloading subsequent to a verification of the manifest data using the manifest data signature, wherein after downloading the update, the update being validated and revalidated by generating a second hash across the update using a public key stored in a file directory of the one or more client devices and comparing the second hash to the first hash, the validation occurring prior to storing the update and the revalidation occurring after storing the update and prior to installation for ensuring that the update has not been compromised.

14. The method of claim 13, wherein the manifest data further comprises a size of the binary.

15. The method of claim 13, further comprising:

generating a version for the update that comprises a timestamp of execution of an operation selected from the group consisting of receipt of the identification, mapping of the identification, generating the hash, and outputting the manifest data; and storing the version for the update as part of the manifest data.

16. A system comprising:

a signature server including—
a signature unit configured to receive an update to a software application;
a first machine-readable medium configured to store a mapping between an identification of the software application and an address of a location of a private key;

a cryptographic device coupled to an external port of the signature server, the cryptographic device including—
a second machine-readable medium configured to store the private key; and
a cryptographic unit configured to generate a signature of the update based on the private key, the signature of the update being stored within manifest data and used to validate and revalidate the update, the update being validated and revalidated by generating a hash across the update using an updateable public key stored in a file directory of one or more client devices and comparing the hash to the signature, the validating occurring prior to storing the update and the revalidating occurring after storing the update and prior to installation for ensuring that the update has not been compromised.

17. The system of claim 16, wherein the signature unit is further configured to assign a timestamp as a version for the update, the timestamp being a time selected from the group consisting of when the update is received by the signature unit, when the signature is generated, and when the timestamp is assigned.

18. The system of claim 17, wherein the signature unit is further configured to receive the update from an update device that is coupled to the signature server over a network, determine a size of update, and return the signature, the timestamp, and the size of the update back to the update device over the network.

19. An apparatus comprising:

a non-transitory machine-readable medium to store an update to a software application; and an update unit to transmit the update over a network to a signature server, the update unit to receive a signature of the update, a size of the update, and a version of the update derived from a timestamp of an operation performed by the signature server on the update, the update unit to generate manifest data for the update, the manifest data comprising a signature for the manifest data, the signature of the update, a location where the update is stored, the size of the update, the version of the update, and an identification of the software application, the update unit to upload the update and manifest data to an update server, the update server to transmit the update from the location included in the manifest data after the manifest data is validated using a signature of the manifest data stored in the manifest data, the update being validated and revalidated by generating a hash across the update using a public key stored in a file directory of the machine-readable medium and comparing the hash to the signature of the update, the validation occurring prior to storing the update and the revalidation occurring after storing the update and prior to installation for ensuring that the update has not been compromised.

20. The apparatus of claim 19, wherein the update unit is to generate a hash across at least one of the signature of the update, the size of the update, the version of the update, and the identification of the software application, the update unit to include the hash as part of the manifest data.

21. The apparatus of claim 20, wherein the update unit is to generate conditional logic that defines a usage attribute for the update, the usage attribute selected from a group consisting of an applicable operating system, an applicable language, an applicable machine architecture, and a setting in a system registry of a client device, the update unit to include the conditional logic as part of the manifest data.

* * * * *